Sept. 10, 1957 B. M. J. LE CLERC 2,806,139

PULSE RESHAPER

Filed June 9, 1952

INVENTOR

Bruno M J. Leclerc

By Watson, Cole, Grindle & Watson

ATTORNEYS

United States Patent Office 2,806,139

Patented Sept. 10, 1957

2,806,139

PULSE RESHAPER

Bruno M. J. Le Clerc, Fontenay-sous-Bois, France, assignor to Compagnie Des Machines Bull (Société Anonyme), Paris, France, a French company Application June 9, 1952, Serial No. 292,563

Claims priority, application France July 16, 1951

6 Claims. (Cl. 250—27)

The present invention relates to a pulse reshaper which may be employed in an electronic calculating machine or any other machine functioning by pulses, in which these pulses, originally of rectangular shape, after having made a certain journey, spread out and take on a shape which is rather triangular, or in any case, far from the original rectangular shape. In the machine considered, it is assumed that there is at least one generator of "fresh pulses," of shape assumed to be strictly rectangular, called "timing pulses"; the invention relates to a device employing the coincidence, at least during a part of their period, of a fresh pulse and of a "used" pulse to recreate a new pulse having as good a shape as a timing pulse.

It is assumed that there exist in the machine in question at least two series of regularly recurrent timing pulses, one of these series may be considered as being derived from the other by a shifting in time by a quantity less than a timing period. The used pulses, originally in coincidence with certain signals of a first series of timing signals, are shaped by the timing signals of a second series, by means of the shaper according to the invention. In this way, the delay between the outputs of used pulses and the outputs of corresponding reshaped pulses is equal to the said shifting between the series, and therefore less than a timing period. The timing signals which will be dealt with in the following description will be those of the said second series. They are therefore delayed relative to the pulses to be reshaped.

The object of the present invention is a pulse reshaper providing an output signal having the form of a flat-topped pulse on a zero baseline, from the application on two appropriate inputs of the said reshaper of a signal to be reshaped of variable amplitude when the latter attains a predetermined sufficient value and of a waveform comprising a flat-topped timing signal on a zero baseline, the said reshaper comprising, between its input and output, a reaction element of which the delay is less than a predetermined duration.

More precisely stated, the present invention has for its subject a multipole regenerator having at least two inputs, of which one is for the signal to be reshaped and the other for the timing signal, and at least one output for the reshaped signal, and comprising a reaction path between an output and an input ofthe signal to be reshaped, such that the signal reintroduced through the reaction path produces a signal of the same polarity as the signal to be reshaped although it may be delayed by a small amount relative to the latter, the said multipole requiring in order to generate an output signal, the simultaneous presence at the appropriate input terminals, of the signal to be reshaped, and of the timing signal, a limiting device being furthermore connected to the input circuit to which the signal to be reshaped is applied.

The present invention has particularly for subject the embodiment of a relatively simple circuit arrangement comprising a small number of elements to embody the said multipole. This mounting is preferably formed by a combination of elements of the amplifying kind with an electronic valve, preferably a pentode, which is particularly advantageous in minimising the deleterious effect produced by ageing of the valve on the constancy of the shape of the output signal supplied by the reshaper.

According to this preferred embodiment, the invention has for an object an electronic valve circuit of which the feed voltages are so chosen that the said valve works below the knee of the "plate current/grid voltage" characteristic, and comprises in its plate circuit a transformer of which a secondary winding feeds the reaction.

The invention has also as an object such a circuit in which the cathode is at a positive potential and receives the negative going timing signals and in which the control grid is biased negatively through a resistor and receives the positive going signals to be reshaped, a rectifying element being directly connected as a by-pass between earth and the said grid to fulfill a function of limiting the amplitude.

One embodiment is illustrated by way of example in the accompanying drawings, wherein.

Figure 1:
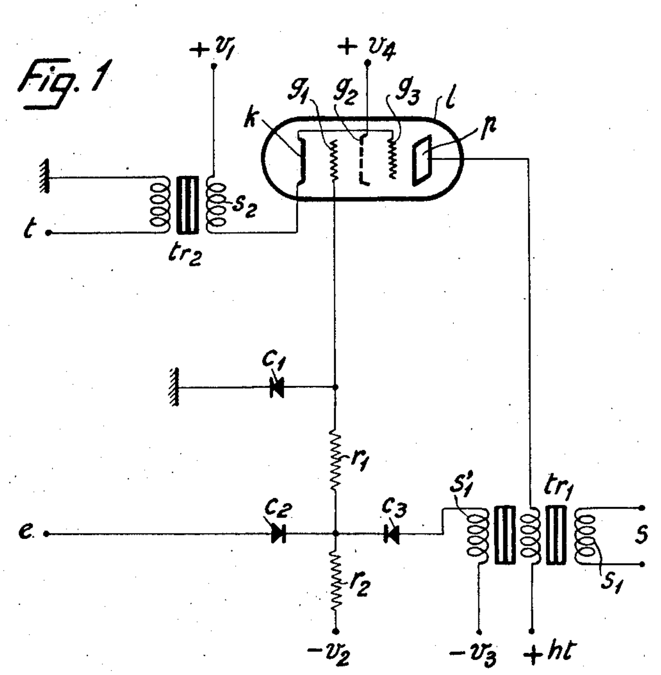
Fig. 1 is a diagram of one form of preferred embodiment of the invention.

In Fig. 1, there has been illustrated at *l* the electronic valve (in the present case a pentode) of the multipole reshaper. The cathode *k* is connected to the suppressor grid *g*3 and to a positive potential +*v*1 through the secondary *s*2 of a transformer *tr*2. The screen grid *g*2 is at a positive potential +*v*4. The control grid *g*1 is connected to a negative potential —*v*2 through the resistors *r*1 and *r*2. A high voltage +*ht* is applied to the plate *p* via a transformer *tr*1 having three windings. The series of voltages *v*1, *v*2, *v*4, *ht* is so chosen as to cause the valve to work below the knee of the "plate current/control grid voltage" characteristic, i. e. at a grid voltage below the incipient plate current bias point. Rectangular negative-going timing pulses arrive at *t* through the transformer *tr*2 or through any other coupling means, and used positive-going pulses arrive at *e*. *c*1, *c*2, *c*3 are rectifying elements of which the function will be explained later on. A secondary winding *s*1 of *tr*1 supplies output pulses at *s*; a further secondary winding *s'*1, connected to a voltage —*v*3 and to the junction of *r*1 and *r*2 through *c*3, constitutes the reaction circuit. *v*3 can be equal to *v*2 or rather larger in absolute value, so as to avoid circulation of a permanent current through *c*3; the sense of the secondary reaction winding *s'*1 is so established as to apply to *r*1 positive-going pulses exceeding a definite amplitude when the valve *l* passes current. *c*3 prevents the pulses from *e*, arriving through *c*2, being directly transmitted by the transformer *tr*1 to *s*. *c*2 prevents the return towards *e* of pulses which would arise from the reaction through *c*3; the use of *c*2 is not necessary in every case and depends on the method of connection with the unit feeding *e*.

Element *c*1, being connected to earth, functions as a voltage limiter, preventing the voltage exceeding zero, at least for the voltages normally applied.

Figure 2:
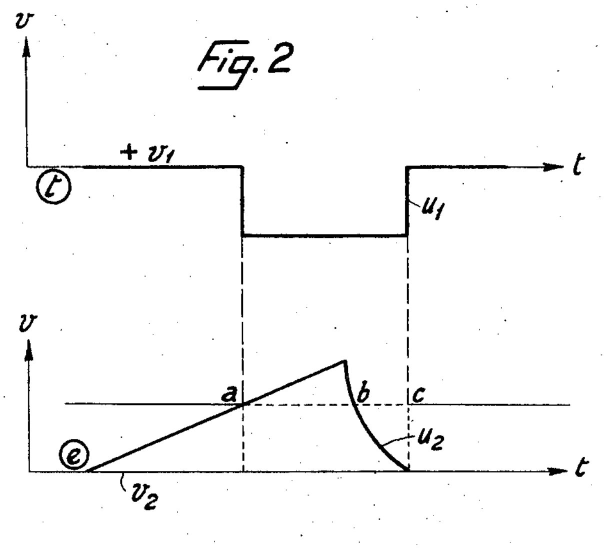
Fig. 2 illustrates the curves showing the shape of the corresponding applied signals.

In Fig. 2 there is illustrated (using the encircled letters *t* and *e* to recall the corresponding terminals), the voltage pulses *u*1 and *u*2, as a function of time *t*. The pulse *u*1 is supposed recurrent at the timing frequency. The used pulse *u*2 exists or does not exist for each timing pulse and when it exists it has to be reshaped.

The exact position, on the characteristic, of the point determining the current through the valve is so chosen that this current can only exceed zero if there is simultaneously a negative voltage on the cathode *k* and a potential equal to or exceeding zero at the control grid $g1$.

The operation of the device is as follows:

It is known that the used pulse $u2$ precedes the timing signal. As long as it is alone, there is no plate current; however, the grid potential rises progressively from the value $-v2$ to the value zero, which is approximately reached at the point $a$, without however being able to exceed this value 0 because of the limiting effect imposed by element $c1$. At $a$ the rectangular pulse $u1$ is produced and the plate current of the valve almost immediately assumes a definite value which remains constant for a certain time. In fact from $a$ to $b$, the pulse $u2$ would tend to cause the potential of the grid to rise but, because of the limiting effect due to the element $c1$, this potential does not exceed the value 0, and, $u1$ remaining constant, the value of the plate current does not change.

From $b$ to $c$, the value of $u2$ drops, but then the reaction intervenes with a certain delay due to $tr1$ and element $c3$ (and which may even be increased by the interposition of delay elements not illustrated) which prevents the grid potential from falling. The result is that the plate current remains constant up to $c$ where it falls sharply to zero. The current in the plate of the valve therefore assumes a rectangular shape, the inverse of $u1$, which is reproduced by the voltage which can be picked up at $s$. If the reaction tends to produce a signal at the control grid, in advance of the point $b$, it will not cause any modification to the voltage waveform at $s$, because of the action of the limiter. Assuming that the effect of the reaction is very rapid, even a short rise in the voltage $u2$ above the level $ac$, following the point $a$ would be sufficient to maintain the regenerated voltage. The only important factor is that the reaction effect should occur at latest at the point $b$.

The invention is evidently not limited to the embodiment which has just been described, the elements constituting the diagram of Fig. 1 may assume many different forms. Thus for example the rectifying elements $c1$, $c2$, $c3$ may be dry rectifiers or diodes. Element $c1$ can be replaced by an electronic valve circuit and elements $c2$ and $c3$ by buffer resistors so as to provide different input impedances for the "used" signals and the reaction signals. The output $s$ may be taken at the reaction winding $s'1$ of the transformer $tr1$, which would only have two windings. Instead of acting on the control grid $g1$ the reaction could act on the screen grid $g2$, the reaction voltage being picked up across an ohmic resistor inserted in the plate circuit of the valve and transferred to the screen grid via a network producing a correct phase for the reaction. The positive going timing signal could be applied, without being limited to the control grid $g1$, while the negative-going used signal could be subjected to limiting and applied to the cathode $k$, etc. All these variations come within the ambit of the invention.

The scope of the invention also includes all circuits with an even number of valves, for example with two valves (or two elements mounted in the same bulb) in which the reaction is effected by the second valve, between the plate of the second valve and grid of the first, by feedback through a large capacity, the plate loads consisting of resistors and not a transformer.

What I claim is:

1. Pulse shaping device for transforming "used" distorted pulses into "fresh" restored pulses through the agency of restoring "timing" pulses timed to coincide at least partly with the used pulses, comprising an amplifier having a first input circuit for said used pulses, a second input circuit for said timing pulses and an output circuit for said fresh pulses, said amplifier having no output signal except when simultaneously a timing pulse and a used pulse occur, a feed-back circuit between said output circuit and said first input circuit, adapted for extending the effect of the used pulse on said amplifier, and a voltage limiter associated with said first input circuit and said feed-back circuit, adapted for limiting the voltages provided by either of said circuits to a predetermined value so that said amplifier is blocked after the end of the timing pulse.

2. Pulse shaping device as claimed in claim 1, wherein said amplifier includes a multiple-electrode electronic valve, the electrodes of which are so biased that normally no current flows through it, the biasing voltages being such that when said timing pulse and said used pulse of predetermined amplitude are applied at the same time to two adequate electrodes, the valve generates a pulse which lasts as long as the above conditions of simultaneousness and amplitude of the pulses.

3. Pulse shaping device as claimed in claim 2 wherein a control grid of said electronic valve is normally at such a negative potential relative to the cathode as to cause the operation point of said valve to lie below the cut-off of its "plate current control grid voltage" characteristic curve, so that no current flows through the valve, while said operation point is shifted beyond the shut-off of said characteristic curve when simultaneously a timing pulse and a used distorted pulse occur, so that the valve becomes conductive.

4. Pulse shaping device as claimed in claim 3, wherein rectangular negative-going timing pulses are applied to the cathode, whereas positive-going used pulses are applied to the control grid.

5. Pulse shaping device as claimed in claim 1, comprising a transformer having a primary winding in said output circuit and a secondary winding connected to said former-mentioned input circuit, the connection being such that the current discharged by said secondary winding into said input circuit is of same polarity as the used pulses.

6. Pulse shaping device as claimed in claim 5, comprising rectifier elements through which the used pulses and the pulses transmitted by the transformer are separately applied to the former-mentioned input circuit.

References Cited in the file of this patent

UNITED STATES PATENTS

| | | |
|---|---|---|
| 2,298,220 | Mathes | Oct. 6, 1942 |
| 2,401,404 | Bedford | June 4, 1946 |
| 2,420,374 | Houghton | May 13, 1947 |
| 2,506,770 | Braden | May 9, 1950 |
| 2,540,923 | Williams | Feb. 6, 1951 |
| 2,562,305 | Ellsworth et al. | July 31, 1951 |
| 2,591,088 | Millman et al. | Apr. 1, 1952 |
| 2,609,501 | Guthrie | Sept. 2, 1952 |
| 2,688,696 | Reeves | Sept. 7, 1954 |
| 2,712,065 | Elbourn et al. | June 28, 1955 |